United States Patent Office 3,644,323
Patented Feb. 22, 1972

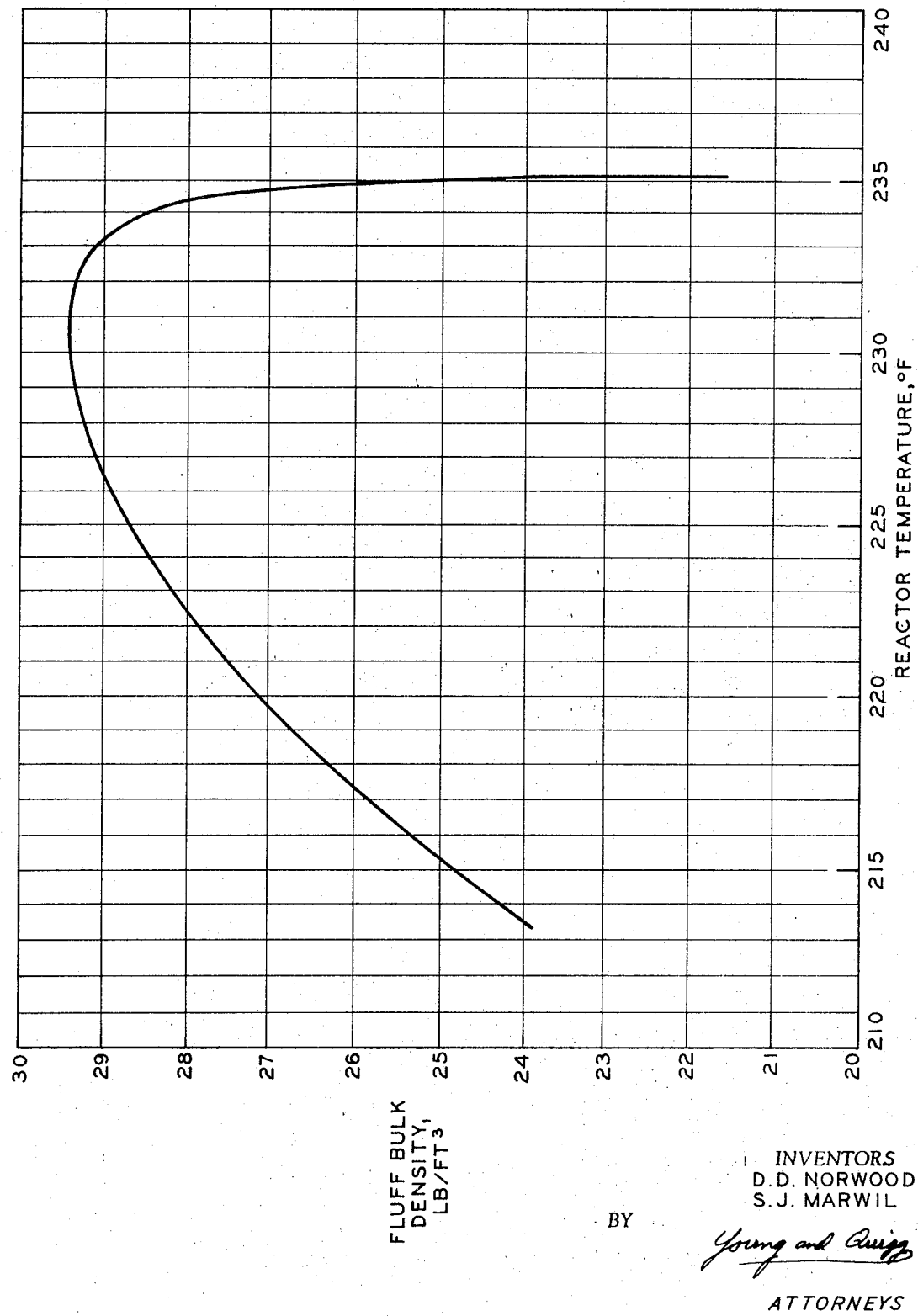

3,644,323
PRODUCTION OF HIGH FLUFF BULK DENSITY PARTICLE-FORM POLYETHYLENES

Donald D. Norwood and Stanley J. Merwil, Bartlesville, Okla., assignors to Phillips Petroleum Company
Filed May 12, 1969, Ser. No. 823,832
Int. Cl. C08f 1/11, 1/66, 3/06
U.S. Cl. 260—94.9 D       5 Claims

ABSTRACT OF THE DISCLOSURE

A method of producing, in a slurry-type reactor, polyethylenes with a high fluff bulk density by operating the reactor within very close parameters of monomer concentration, temperature, pressure.

---

This invention relates ot an improved process for preparing polymers in particle-form. The invention further relates to a method of producing solid-form or particle-form polyethylenes with high fluff bulk densities.

The fluff bulk density of the polyethylenes is a measure of product swelling in the slurry process reactor. A low fluff bulk density product is reflected in undesirably high swelling of polymer in the reactor. Conversely, a product with a high fluff bulk density is reflected by desirably low swelling within the reactor in the slurry process.

Furthermore, a product of low fluff bulk density is one that occupies a relatively large volume of space as a dry product relative to a given number of pounds, with consequent increases in costs for bulk storage and for shipping containers. A polyethylene with a high fluff bulk density can be much more economically handled since storage facilities will handle many more pounds of product within the same volume, shipping containers will handle more material per volume or can be of much smaller size, and shipping costs are generally lower.

In the slurry process of polymerization a solid-form or particle-form material is prepared directly in the reaction zone in the form of a slurry of particles in a reaction diluent in which the polymer is essentially insoluble and in which the unpolymerized monomer is essentially soluble, being maintained in solution under polymerization temperatures and pressures.

Previously, the concentration of ethylene and any comonomer in the reaction diluent-solvent has been maintained at or near the saturation level in order to produce as much polymer product as possible with minimum consumption of catalyst. However, the fluff bulk density of the product has generally tended to be low.

Ethylene, together with any desired monomers copolymerizable therewith, have been polymerized in the slurry process over a broad temperature range of about 100 to 500° F., and within a broad pressure range of from about 0 to about 2000 p.s.i.a. In the slurry process reactor, the concentration of monomers has generally been at least 18 to 20 mole percent and upwards. More specifically, a saturated condition has been maintained, using higher pressures at higher temperatures.

Surprisingly, we have found a way of producing in a slurry process reactor solid-form or particle-form polyethylenes with a high fluff bulk density of at least 28 pounds per cubic foot by operating within very tight parameters of monomer concentration between about 9 and 10 mole percent, reaction temperature limited to within 222.5 and 234.5° F., and pressures from about 425 to 500 p.s.i.a.

Specifically, reducing sharply the mole percent concentration of monomers in the slurry process reactor while operating within a very narrow temperature range and limited pressure area results in a polyethylene product of high fluff bulk density of at least 28 pounds per cubic foot.

Accordingly, it is an object of our invention to provide an improved method of polymerizing ethylene in a slurry type retaction zone.

Another object of our invention is to provide an improved process and method for preparing polyethylenes in solid particle-form.

A further object is to produce, by the particle-form process in a slurry reactor, ethylene polymers and copolymers of high fluff bulk density with over about 28 pounds per cubic foot.

Further objects, aspects, and the several advantages of our invention in addition to the objects already outlined will be apparent to one skill in the art from the description and appended claims.

Our invention is of specific application to the polymerization of ethylene and monomers copolymerizable therewith, and specifically to the polymerization process where the monomers are dissolved in an inert liquid diluent solvent and there react to form a polymer essentially insoluble in the diluent solvent under polymerization conditions thus resulting in a particle-form or solid-form product.

In a preferred embodiment of our invention, the polymerization is carried out in a loop-type reactor provided with an impeller or circulator to insure highly turbulent flow during the reaction and polymerization interval. In the loop-type reactor, the reaction zone is in the form of a continuous loop or loops wherein the circulation is maintained by the force of the circulator. In the slurry process and in the loop-type reactor, operation in the liquid phase is preferable since removal of exothermic heat of reaction is much more easily accomplished.

As hereinbefore described, the production of polyethylenes with a high fluff bulk density of greater than about 28 pounds per cubic foot bulk density is highly desirable both for production requirements since the property is reflected in product swelling in the reactor, and further as an economy means for storage and shipping requirements.

In terms of the polymerization of ethylene with a chromium oxide catalyst, we have discovered that reducing the concentration of monomers to a range of about 9 to 10 mole percent while operating the slurry process reactor within a narrow temperature range of 222.5 to 234.5° F., while maintaining a pressure of from about 425 to 500 p.s.i.a. or just sufficient to maintain liquid conditions in the reactor within the required temperature range, that the solid polyethylene product has the desired fluff bulk density of at least 28 pounds per cubic foot. The process is illustrated by experimental data particularly as shown on the attached graph.

EXAMPLE

The attached graph shows most clearly and graphically the discovery that we have made. The graph represents a plot of the fluff bulk density of a polyethylene in pounds per cubic foot against reactor temperature in degrees Fahrenheit. The graph, of course, represents numerous data points plotted as a curve to clearly illustrate the sharp rise in fluff bulk density within a limited temperature area, and the sharp drop-off in fluff bulk density if the temperature is exceeded. All runs were made within a narrow monomer concentration of 9 to 10 mole percent, close reactor pressure range within 425 to 500 p.s.i.a., and other factors held constant.

A fluff bulk density of a polyethylene of greater than about 28 pounds per cubic foot is desired, as we have said. The graph clearly illustrates that the desired fluff bulk density cannot be obtained until a temperature in the reactor of about 222.5° F. is obtained. The graph further clearly shows that the desired high fluff bulk density is maintained at identical ethylene concentrations and with temperatures above about 222.5 up to and including 234.5° F., but that a temperature rise beyond this point results in a product sadly lacking in desired fluff bulk density.

All runs illustrated by this curve were made under, as closely as possible, similar conditions of ethylene concentration of between 9 and 10 mole percent, using a chromium oxide catalyst which was activated at temperatures of 1500 to 1600° F., and all other factors, such as time and pressure, were maintained consistently including essentially liquid conditions in the reactor, with the only variable being the reaction temperature as illustrated by this graph. All reactions were carried out in a solvent diluent of isobutane wherein the ethylene concentration was the aforesaid 9 to 10 mole percent.

The use of ethylene to form polyethylene is the most commercially important process. Mixtures of ethylene with a minor amount of other unsaturated hydrocarbons such as propylene, 1-butene, 1-pentene, 1-hexene, and the like, are within the scope of our invention. It also is within the scope of our invention to use as a comonomer with ethylene a minor amount of one or more of the lower diolefins such as 1,3-butadiene, 1,4-pentadiene, 1,5-hexadiene, and similar conjugated and nonconjugated diolefins such as dicyclopentadiene. In general, the comonomer can have from 3 to 12 carbon atoms per molecule. The amount of comonomer can be in the range of 1 to 25 weight percent based on total monomers, more usually 1 to 15 weight percent.

Operating according to the method of our invention, the ethylene, or a mixture of ethylene with a minor amount of another unsaturated comonomer selected from the groups discussed above, is contacted in a polymerization zone with a suspension of a chromium oxide catalyst in a liquid hydrocarbon such as a paraffinic or naphthenic hydrocarbon, contacting at a temperature held between 222.5 and 234.5° F. under essentially liquid conditions to produce the desired result of high fluff bulk density greater than about 28.

Examples of liquid hydrocarbons which can be used as a polymerization or reaction diluent are isobutane, pentane, isopentane, and mixtures of two or more thereof. Examples of naphthenic hydrocarbons include cyclohexane, cyclopentane, methylcyclopentane, methylcyclohexane, ethylcyclohexane, methylethylcyclopentane, methylpropylcyclohexane, and mixtures thereof, and the like. Polymerization reaction diluent should be inert and nondeleterious to the catalyst used. Aromatics are generally less desirable as diluents because they or the impurities sometimes associated with them may tend to decrease catalyst activity, and hence increase costs. We have found a most suitable solvent to be isobutane for polymerization of ethylene.

The chromium oxide catalyst used in the process of our invention is usually in the form of a powder so as to be readily maintained in suspension as a slurry in the liquid hydrocarbon reaction diluent. For this reason, the catalyst usually has a particle size of about 100 mesh or smaller, preferably 100 microns and smaller. The concentration of the catalyst in the polymerization zone can vary within fairly wide limits, generally 0.01 to 5 weight percent, preferably 0.01 to 0.1 weight percent, based on the total amount of liquid hydrocarbon reaction diluent present. The lower amounts of catalysts are preferable from the point of view of economy, and to avoid the necessity to require removal of spent catalyst from the polymer product.

From a production standpoint, maintenance of minimum as well as very constant feed rates of catalyst to the reactor are preferred in order to avoid upsets in production, and because of the difficulties experienced in stabilizing feed rates of dry materials such as the dry catalysts.

The catalysts useful to this invention are those chromium oxides containing catalysts whose preparation is described in United States Letters Patent 2,825,721. It is particularly applicable to catalysts comprising microspiroidal silica or silica-alumina over which there has been distributed about 1 to 5 weight percent of an oxide of chromium, at least part of which is in hexavalent form at the initial contacting therewith with the monomer.

Catalyst activation can be effected by pretreatment with dry air for 0.1 to 50 hours, preferably 3 to 10 hours, at temperatures of 750 to 2,000° F., preferably 900 to 1,600° F.

It is within the scope of our invention to utilize a chromium oxide catalyst, of which the support, such as silica, silica-alumina, alumina, and the like, has been treated with a fluoride, such as hydrogen fluoride, hydrated alumina fluoride, or ammonium fluorosilicate, to increase the polymerization activity of the catalyst.

While there are no critical residence or contact times for practicing the process of this invention, the contact time in the slurry-type reactor generally will be in the range of about 1 to 12 hours, more usually 1 to 5 hours.

The feedstream, i.e., the ethylene and any comonomer together with the reaction diluent, should be substantially anhydrous, and should further be substantially free of other catalyst poisons such as sulfur compounds, carbon monoxide, oxygen, and halogen compounds. When small amounts of moisture or other catalyst poisons are present, the feedstream should be suitably cleansed by pretreating, by methods known to the art, prior to the polymerization reactions. Where minor amounts of such undesirable materials are not preremoved, it may be necessary to adjust the feed of catalyst accordingly to compensate for decreased catalyst activity. In general, as stated hereinbefore, it has been found desirable from a production standpoint to maintain a constant catalyst feed into the reactor. Varying a catalyst feed rate usually results in operational problems and particularly difficulties in maintaining control of product quality and uniformity.

Although not essential to the conduct of the polymerization itself, it is often desirable to carry out the polymerization in the presence of elemental hydrogen. When so operating, hydrogen is added in an amount sufficient to provide 0.15 to 0.40 mole percent hydrogen in the liquid phase in the polymerization zone. By operating in the presence of hydrogen, the productivity of the catalyst is found to be increased, and certain properties of the polymer, such as flexural modulus, are improved.

Having described our invention by providing specific samples relative to ethylene, it is to be understood that our invention should not be unduly restricted. Reasonable variations and modifications are possible within the scope of this disclosure without departing from the scope and spirit thereof.

What is claimed is:

1. A process for producing a particle-form polyethylene which comprises contacting ethylene under polymerization conditions in a polymerization zone, said conditions consisting of an ethylene concentration of from about 9 to about 10 mole percent, a chromium oxide polymerization catalyst, a polymerization diluent in which said monomer is essentially soluble and said particle-form polyethylene is essentially insoluble, and a temperature of from about 222.5 to about 234.5° F., and thereby producing a particle-form polyethylene with a fluff bulk density of at least 28.

2. A process according to the method of claim 1 wherein the said chromium oxide catalyst comprises from about 1 to about 5 weight percent chromium oxide on a support.

3. The process of claim 1 wherein the said polymerization diluent is selected from isobutane, pentane, isopentane, and mixtures of at least two thereof.

4. The process of claim 2 wherein the said chromium oxide catalyst is used in a concentration of from about 0.01 to about 5 weight percent based on the total of said diluent in the said polymerization zone.

5. The process of claim 1 wherein said polymerization conditions include the presence of elemental hydrogen sufficient to provide from about 0.15 to about 0.40 mole percent hydrogen in the liquid phase in the polymerization zone.

References Cited

High Polymers, vol. XVIII. Copolymerization (ed. by Ham), Interscience Publishers, New York, 1964, p. 212.

JOSEPH L. SCHOFER, Primary Examiner

A. HOLLER, Assistant Examiner

U.S. Cl. X.R.

260—88.2 B, 94.9 B